United States Patent [19]

Colebrook et al.

[11] 3,954,224

[45] May 4, 1976

[54] JET NOISE SUPPRESSOR

[75] Inventors: Ross W. Colebrook, Bellevue; Frank G. Strout, Kent; Charles P. Wright, Seattle, all of Wash.

[73] Assignee: The Boeing Company, Seattle, Wash.

[22] Filed: June 23, 1975

[21] Appl. No.: 589,075

Related U.S. Application Data

[63] Continuation of Ser. No. 461,641, April 17, 1974.

[52] U.S. Cl. ..................... 239/265.13; 181/33 HC; 239/265.17
[51] Int. Cl.² ........................................ B64D 33/04
[58] Field of Search .................. 181/33 HC, 33 HB; 239/265.13, 265.17

[56] References Cited
UNITED STATES PATENTS

| 3,392,529 | 7/1968  | Pike et al. ................ | 239/265.13 X |
| 3,579,993 | 5/1971  | Tanner ..................... | 181/33 HC X  |
| 3,587,973 | 6/1971  | Wolf et al. ................ | 239/265.13   |
| 3,605,939 | 9/1971  | Duthion .................... | 181/33 HC    |
| 3,612,212 | 10/1971 | Macdonald .................. | 181/33 HC    |
| 3,625,009 | 12/1971 | Schairer .................... | 181/33 HB X  |

*Primary Examiner*—Lawrence R. Franklin
*Attorney, Agent, or Firm*—Robert W. Beach

[57] ABSTRACT

Multiported and multinozzled sectors are pivotally mounted to swing between positions cooperatively spanning a jet engine exhaust duct and retracted positions alongside the wall of such duct. Such sectors are located between a forward nozzle section and a rearward nozzle section deformable to alter the contour of the passage through the exhaust duct. Such nozzle sections and noise suppressor sectors are located rearwardly of a thrust reverser. Each nozzle is of elongated cross section, preferably being elliptical, and arranged so that the greater dimension or major axis extends substantially radially of the noise suppressor sector. The nozzles are dimensioned, proportioned and arranged to provide adequate flow through them and to afford space between the nozzles to facilitate flow of ventilating air to mix equally with the exhaust gas flowing through all the nozzles at least in the central portion of the noise suppressor.

2 Claims, 9 Drawing Figures

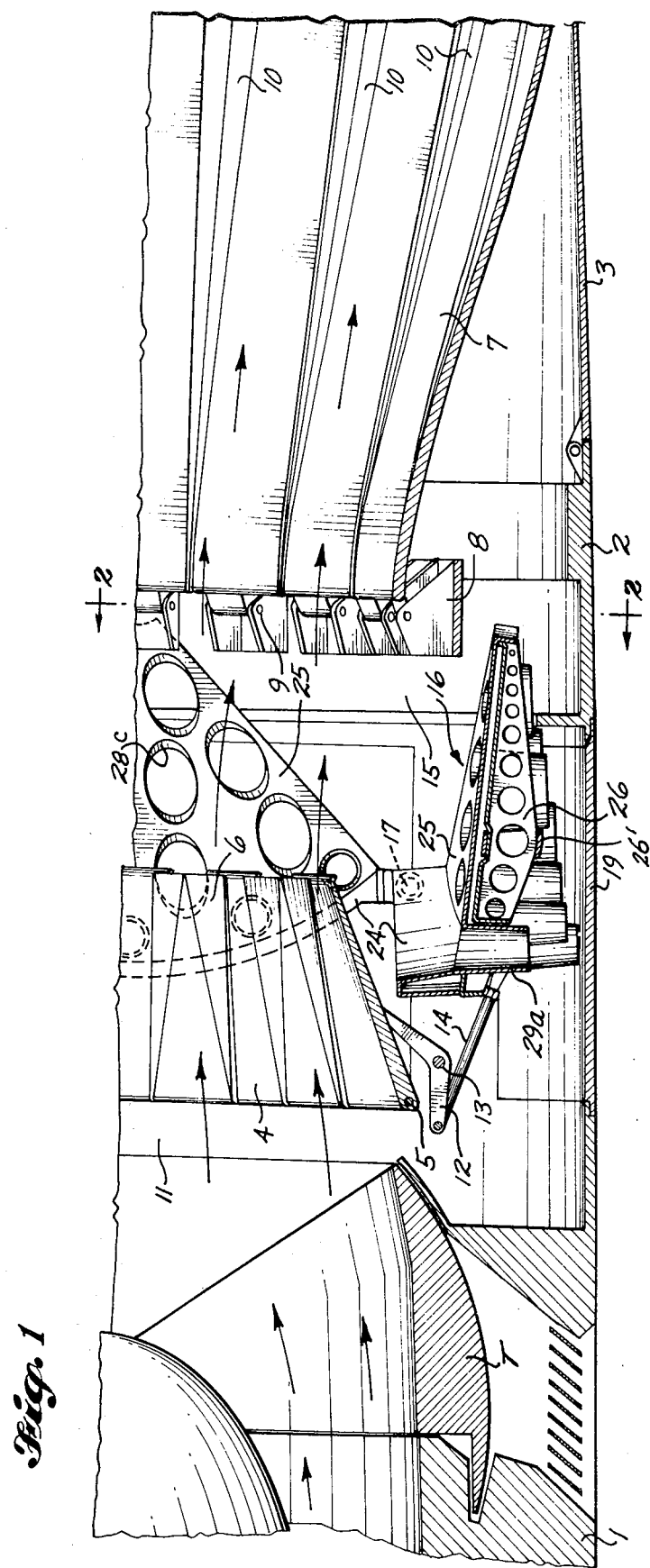

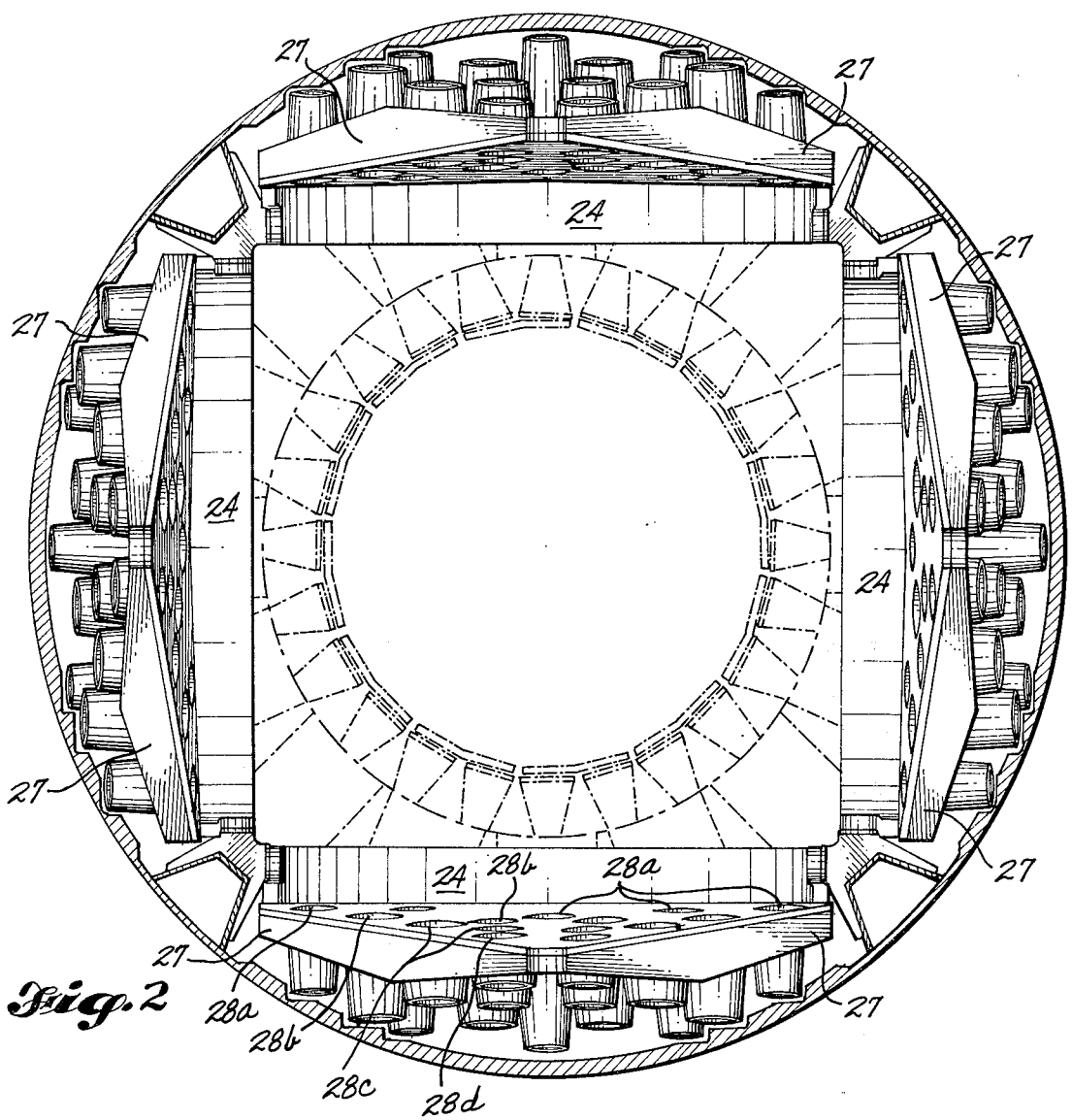
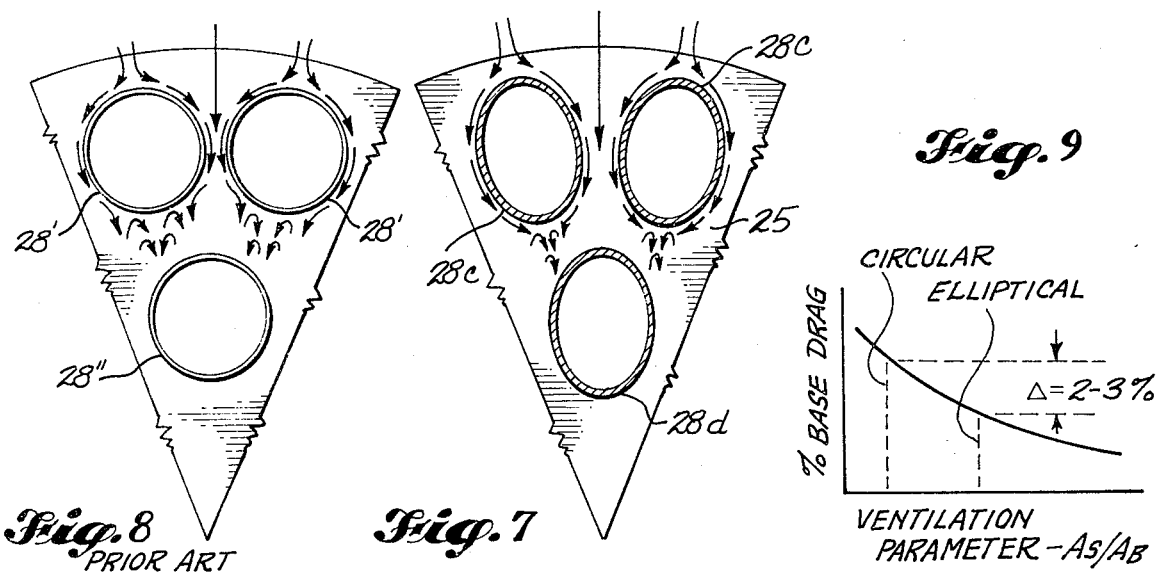

JET NOISE SUPPRESSOR

This is a continuation of application Ser. No. 461,641, filed Apr. 17, 1974.

This invention relates to exhaust gas discharge ducts for jet engines intended to operate at supersonic speeds, which are equipped with suppressors for quieting the jet noise at subsonic speeds and which can be retracted out of the path of the exhaust gas for most effective operation of the jet engine at supersonic speeds.

The noise of jet aircraft engines results from three principal aspects of the engine operation: first, the jet roar or rumble caused by the turbulent mixing of the hot exhaust gases with the atmosphere; second, the intake of air into the engine; and, third, where a turbofan is incorporated in the engine, the whine of the fan. Different treatments have been provided for the different types of noise and probably the greatest problem has been to subdue the roaring noise of the jet.

Utilization of multitube exhausts has proven to be beneficial in suppressing jet noise, but such multitube exhausts have also resulted in undesirable reduction in thrust even at subsonic speeds, while at supersonic speeds the reduction in thrust caused by such installations has proven to be too great to be practical. The Wolf et al. U.S. Pat. No. 3,587,973 and the Duthion U.S. Pat. No. 3,605,939 disclose multinozzle exhaust elements which are retractable to enable the noise suppressor mechanism to be removed from the exhaust gas flow under cruising conditions. The present invention involves improvements in structure over such installations.

It is a principal object of this invention to discharge exhaust gas from a jet engine through a multiplicity of nozzles to which ample ambient air is supplied for mixing with the exhaust gas so as to reduce the jet speed and consequently the noise.

In accomplishing the above object, it is also an object to minimize drag and consequent reduction in thrust resulting from discharge of the exhaust gas through a multiplicity of nozzles.

In supplying ambient air to mix with the exhaust gas from the jet engine, it is an object to facilitate flow of ambient air equally to each individual nozzle in a cluster of nozzles.

Another object is to effect mixing of ambient air with the exhaust gas discharged from each nozzle as quickly as possible and with as little turbulence as possible.

A further object is to postpone mixing of exhaust gas discharged through adjacent nozzles of a cluster for a time sufficient to minimize turbulence.

An additional object is to provide a structure which will afford sufficient flow area for exhaust gas through a cluster of nozzles, which structure also is of adequate strength.

FIG. 1 is a longitudinal section through a portion of the exhaust duct of a jet engine, and FIG. 2 is a section taken on line 2—2 of FIG. 1.

FIG. 7 is a somewhat diagrammatic transverse section through noise suppressor structure incorporating features of the present invention, and FIG. 8 is a similar view of prior art structure.

FIGS. 9 is a graph illustrating capabilities of the present invention.

The noise from the exhaust discharge of an aircraft jet engine is caused primarily by the turbulence created in relatively still air by discharging a large volume of hot gas in a unitary blast from the exhaust pipe of a jet engine. Upon emergence into the atmosphere from the engine tail pipe, the outer periphery of the blast tends to be cooled and retarded by contact with the atmospheric air, causing a differential speed between the central portion of the blast and its peripheral portion which induces turbulence. Prior art devices have sought to reduce such turbulence and the resultant noise by dividing the unitary jet blast into a multiplicity of small jets and to supply ambient air to each of such small jets for mixing with the exhaust gas to cool it. Exhaust duct structures utilized previously for this purpose have not been able to supply sufficient ambient air to the jets in the central portion of the divided jet cluster to cool the exhaust gas of such jets as effectively as the jets in the peripheral portion of the cluster.

The structure of the present invention increases the supply of ambient air to a multiplicity of jets into which the blast of a jet engine exhaust is divided, while enabling the jet blast-dividing structure to be retracted from the path of exhaust travel to increase propulsion efficiency when the aircraft is flying in regions where no benefit would be obtained by suppressing the noise of the engine exhaust blast.

Figure 3:
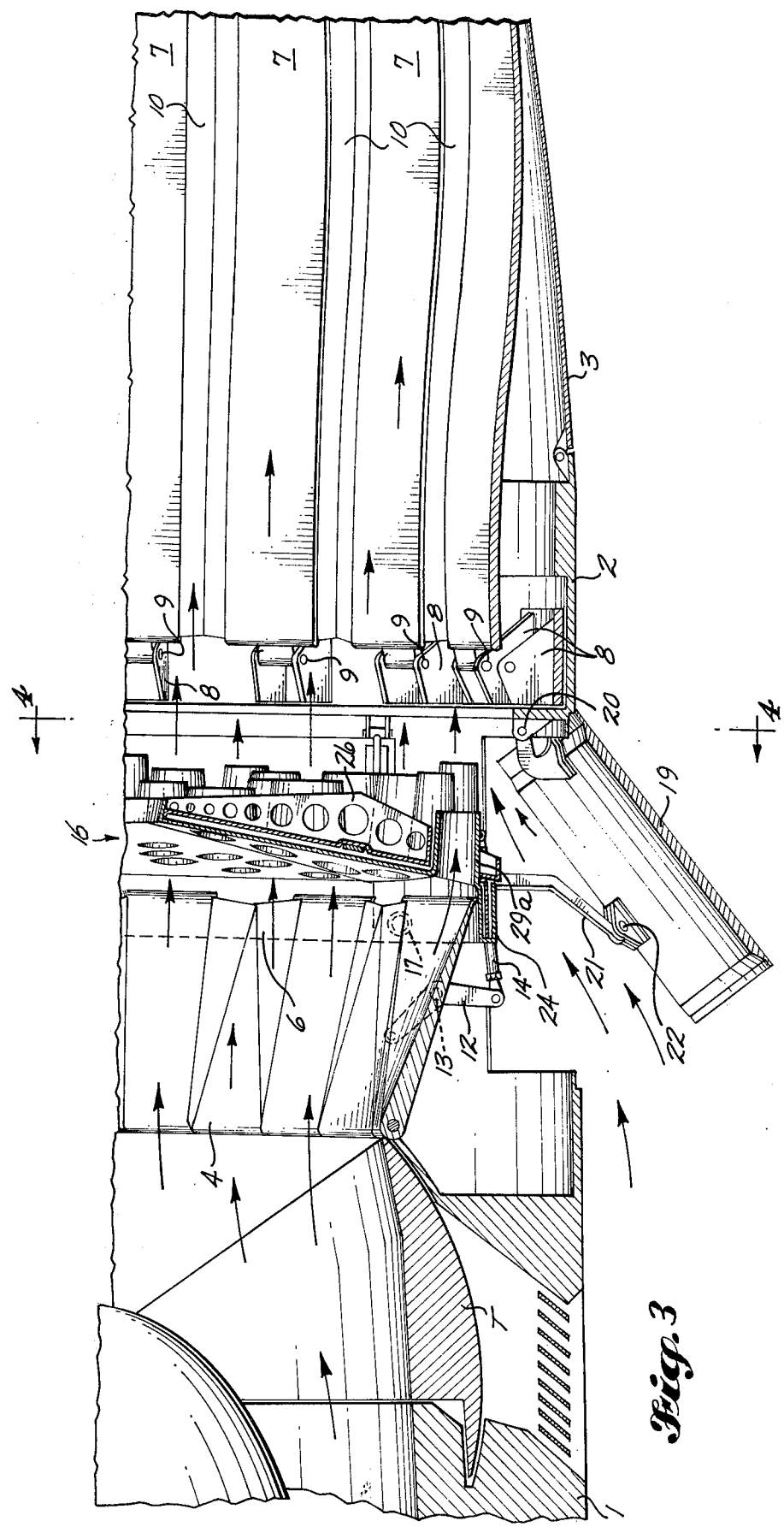
FIG. 3 is a longitudinal section similar to FIG. 1 but showing parts in a different relationship.

The jet blast is discharged from a conventional jet engine 1 through the tail pipe 2 which includes a nozzle 3 adjustable to vary the discharge area. A segmented annular constrictor formed by edge-overlapping segments 4 is interposed between the jet engine 1 rearwardly of the thrust reverser T and the tail pipe 2. Such segments are mounted on pivots 5 adjacent to their leading ends for swinging of their rear portions between an inwardly swung constricting position shown in FIG. 1 and the outwardly swung expanded position shown in FIG. 3. Alternate segments include flexible gusset portions 6 that overlap edge portions of the adjacent segments circumferentially to a greater extent when the constrictor is in the constricting position of FIG. 1 than when it is expanded as shown in FIG. 3.

The ejector within the discharge nozzle 3 is of variable area, being composed principally of primary strip segments 7. The leading ends of such segments are attached to the tail pipe by clevis connections including lugs received between circumferentially spaced, radially projecting plates 8 connected to the lugs of the strip segments by pivot pins 9. Adjacent edges of adjacent strip segments 7 are connected by longitudinally folded filler strips 10 that can expand edgewise by unfolding from the condition shown in FIG. 1 in which the leading end of the ejector is circumferentially contracted to the spread condition shown in FIG. 3 when the leading end of the ejector is circumferentialy expanded.

As indicated in FIG. 1, the trailing end of the constrictor formed by segments 4 and the leading end of the ejector are both in contracted condition. Conversely, when the constrictor is expanded as shown in FIG. 3, the leading end of the ejector must also be expanded, while the ejector trailing end and discharge nozzle 3 are constricted. FIGS. 1 and 3 show a bell crank 12 mounted on a pivot 13. One end of the bell crank is connected to a strip segment 4 of the constrictor for swinging such segment and the other end is connected to a link 14 to be swung by lengthwise reciprocation of such link. Similar bell cranks can be connected to the other constrictor segments for effecting coordinated swinging of all of such segments about their pivots 5.

The noise suppressor is located in the tail pipe 2 between the constrictor and the ejector. Such noise suppressor is composed of cooperating sectors 16 mounted by trunnions 17 at opposite ends of the sector arc to swing about axes disposed chordally of the jet pipe and the sector arcs between the outwardly swung retracted positions shown in FIGS. 1 and 2 and the inwardly swung operative positions of FIGS. 3 and 4. The number and extent of such sectors should be such that, when they are in their inwardly swung operative positions, they will cooperatively form a substantially circular plate which is interposed between the constrictor and the ejector of the discharge nozzle.

Figure 4:
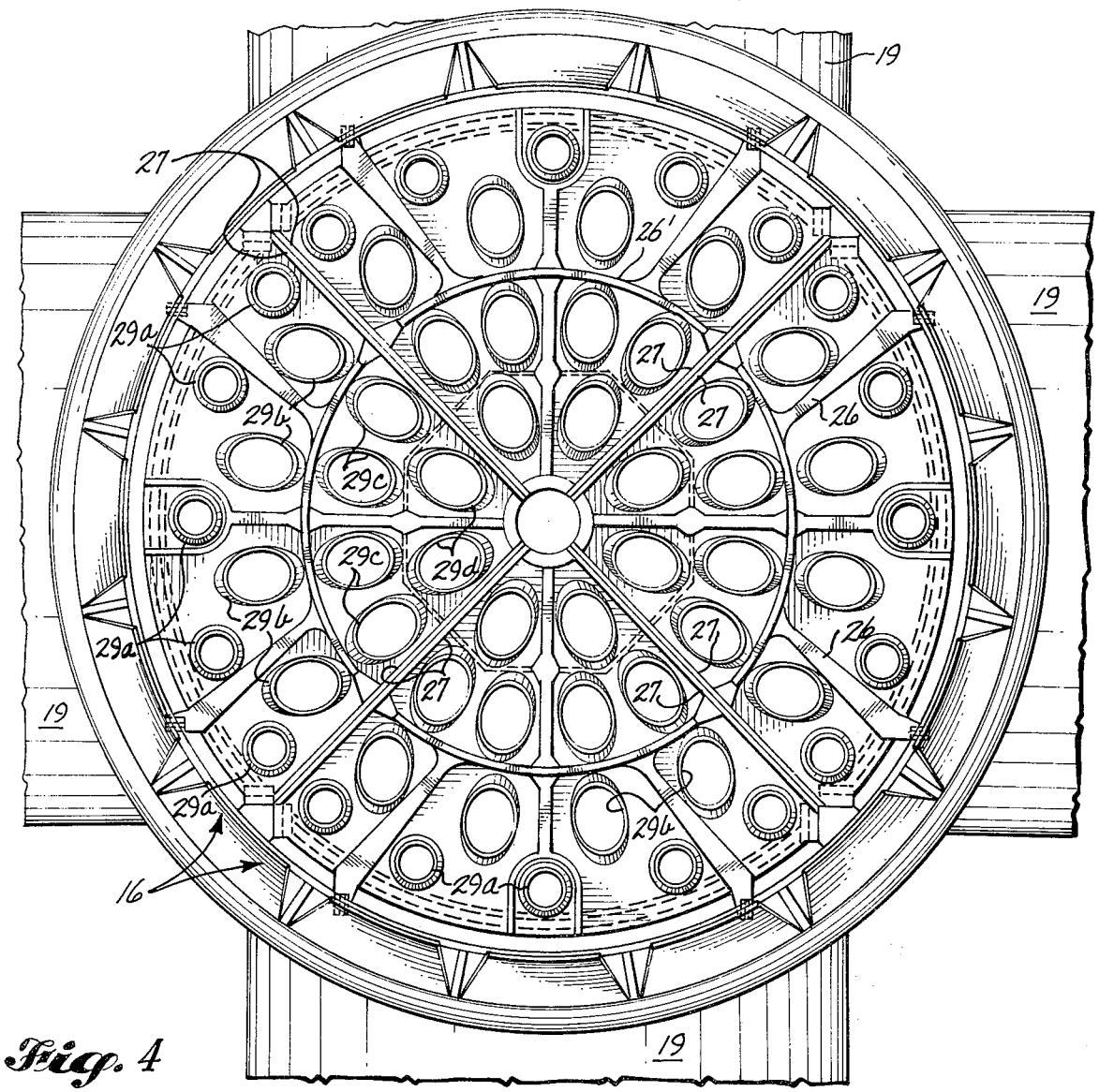
FIG. 4 is a transverse section similar to FIG. 2 taken on line 4—4 of FIG. 3.

When the noise suppressor sectors are in their inwardly swung operative positions of FIGS. 3 and 4, exhaust gas from the jet engine 1 can be discharged only through ports of such noise suppressor sectors. Since such ports can occupy only a portion of the entire cross-sectional area of the tail pipe, it is desirable for the overall cross-sectional area of the tail pipe immediately ahead of the noise suppressor to be larger when the noise suppressor segments are in their inwardly swung positions of FIGS. 3 and 4 than when they are in their outwardly swung retracted positions of FIGS. 1 and 2. Consequently, the constrictor should be in its expanded condition of FIG. 3 when the noise suppressor sectors are in their inwardly swung operative positions shown in that figure, and the constrictor should be in its passage-constricting condition shown in FIG. 1 when the noise suppressor sectors are swung outwardly into their retracted positions of FIG. 1.

Figures 5, 6:
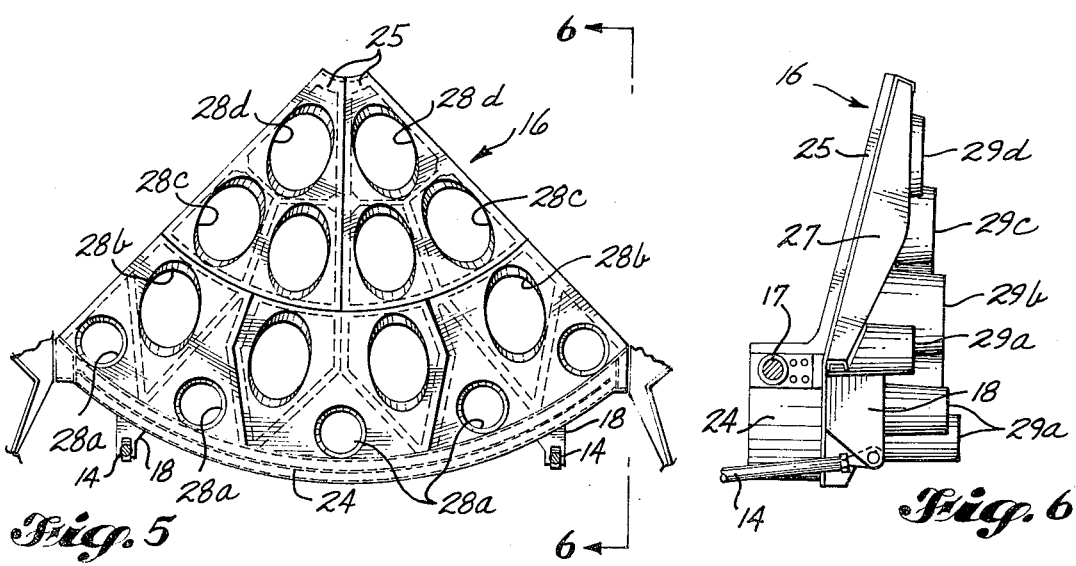
FIG. 5 is an elevation of a sector of the noise suppressor seen from the side opposite that shown in FIG. 4.
FIG. 6 is an elevation of such sector viewed from line 6—6 of FIG. 5.

In order to insure that the swinging of the noise suppressor sectors between operative and retracted positions is coordinated with expanding and constricting adjustment of the constrictor, the links 14 are connected to the bell cranks 12, as described above, and to the noise suppressor sectors 16. The rearward ends of such links are connected to lugs 18 projecting radially from the noise suppressor sectors, as shown in FIGS. 1, 5 and 6. The sectors may be swung about trunnions 17 by known mechanism, such as that shown in Wolf et al. U.S. Pat. No. 3,587,973, for example.

When the noise suppressor sectors 16 are disposed in their inwardly swung positions so as to be operative for suppressng noise of the jet blast, apertures in the tail pipe periphery are uncovered by outwardly swinging blow-in doors 19 for supplying supplemental air to the multiplicity of jets emitted from the downstream side of the noise suppressor before the exhaust gas enters the ejector rather than after it is discharged from the trailing end of the nozzle 3. The trailing ends of such doors are mounted on the tail pipe by pivots 20 so that their leading ends can be swung outwardly from the closed position of the doors shown in FIG. 1 to the scooping position shown in FIG. 3. The blow-in doors can be swung between such positions by links 21 connected to the doors by pivots 22.

Each noise suppressor sector 16 includes a complementally arcuate flange 24 which is arcuately coextensive with and projects axially upstream from the circumferential edge of its sector plate 25. The opposite ends of the flange are supported by the trunnions 17. Such flange is axially wide as shown in FIGS. 2, 6 and 7, so as to be able to support rigidly the multiported sector plate 25. As shown best in FIG. 4, the plates are stiffened by ribs or fins 26 projecting from the downstream sides of the plates between their ports and extending generally radially of the plate in most instances. An axially extending flange 27 on each radial edge of the plate stiffens the sector edge. Since the lengths of such fins and flanges extend generally radially, they do not obstruct radially inward flow of ventilating air. The circular member 26' tying the edge flanges 27 is an axially thin band, as shown in FIG. 1, so as not to obstruct the radially inward airflow.

The multiported plate 25 of each noise suppressor sector has ports through it arranged generally in circumferentially arcuate and radially extending substantially straight rows. As shown best in FIG. 5, the representative arrangement of ports includes an outermost arcuate row of ports 28a, a next inner row of ports 28b, a third row of ports 28c, and the innermost row of ports 28d. The ports 28a of the outermost row are not aligned radially with the ports 28b and 28c of the intermediate rows, but two of the ports 28a are aligned substantially radially with ports 28d of the innermost row. Ports 28b, 28c and 28d are aligned generally radially as shown in FIG. 5. The ports of the noise suppressor have individual nozzles 29a, 29b, 29c, and 29d projecting rearwardly from the downstream side of the respective ports 28a, 28b, 28c and 28d.

The jet engine noise is suppressed by dividing the exhaust gas into a number of small jets. The number and size of the ports through each sector plate 25 which divide the exhaust gas flow into such jets preferably are selected to provide maximum flow compatible with adequate strength of the sector plates and division of the jet exhaust blast into a number of components sufficiently large to produce effective noise suppression when associated with other features of the present invention. In suppressing exhaust noise most effectively, it is not sufficient simply to divide the jet exhaust blast into a multiplicity of small jets, but each of those small jets should be mixed with ambient air both for cooling the exhaust gas and for reducing its speed. The least power loss occurs if ample mixing air is supplied to all of the individual jets equally.

A major problem has been that the supply of ambient air for mixing with the exhaust gas of the jets in the central portion of a jet cluster has been inadequate. In order to move air admitted through the peripheral passages formed by opening blow-in doors 19 into the central portion of the jet cluster in order to mix with the exhaust gas of such jets, it is necessary to provide passages extending generally radially which are relatively wide circumferentially and axially deep for passing ventilating air radially inward between the individual nozzles 29b in order to reach the jets passing through nozzles 29c, and ventilating air must pass radially inward between adjacent nozzles 29c in order to reach the jets passing through nozzles 29d. The depth of the passages is increased by making the individual nozzles as long as possible without interfering with the swinging of the sectors into the fully retracted positions shown in FIGS. 1 and 2. The greater the nozzle length, the greater will be the axial depth of the generally radial passages between the nozzles and, therefore, the greater will be the amount of ventilating air supplied through those passages for mixing with the exhaust gas jets.

By comparing FIGS. 7 and 8, it will be seen that flattening of the ports 28b, 28c and 28d circumferentially, so that the radial dimension of the port in each instance is greater than its circumferential dimension, increases the circumferential extent, and consequently the effective width, of the generally radial passages between the nozzles through which ventilating air must flow from the ventilation apertures controlled by doors 19 to the exhaust gas jets discharged from nozzles 28c and 28d. It has been experimentally determined that the outer ports 28a should be smaller than ports 28b, 28c and 28d to reduce the high frequency noise of the exhaust gas, and all of said ports 28b, 28c and 28d are of substantially the same size for equal distribution of jet exhaust discharge and equal supply of ventilation air to them for maximum reduction of low frequency noise. Because the ports 28a are small, the circumferential width of the passages between adjacent nozzles 29a for flow of ventilating air toward the center of the tail pipe is ample; therefore, the ports 28a need not be of circumferentially flattened or radially elongated cross section. Ports 28b are shown as being circumferentially flattened and radially elongated to facilitate flow of ambient ventilating air between adjacent nozzles 29b to the exhaust gas flowing through nozzles 29c and 29d. Making ports 28c of similarly flattened shape facilitates flow of ventilating ambient air to the exhaust gas flowing through the inner nozzles 29d.

Where individual nozzles projecting from the rear side of multiported noise suppressor plates have previously been provided, the ports and nozzles have been of circular cross section and located circumferentially close together as indicated by the cylindrical ports 28' and 28'' in FIG. 8. The present invention enables ports of a given cross-sectional area to be located closer to the center of the noise suppressor by making those ports circumferentially flattened and radially elongated, as illustrated by the ports 28d in contrast to the circular ports 28'' shown in FIG. 8. Also by making the ports 28c in the next outer row of circumferentially flattened and radially elongated shape, instead of being circular as are the ports 28' shown in FIG. 8, a larger passage for flow of ambient ventilation air between the root portions of nozzles 29c is provided for flow of ventilating air generally radially inward to the innermost jets flowing through nozzles 29d.

It has also been found that making the ports through the noise suppressor plates 25 of substantially elliptical shape having a greater radial extent than circumferential extent reduces the resistance to radially inward flow of ventilating air to the exhaust gas flowing through the ports of the noise suppressor, which contributes to an increased flow of such ventilating air through radially-directed corridors between adjacent radially-extending rows of nozzles. The generally elliptical cross section of the root portions of nozzles 29b and 29c are more streamlined and, therefore, reduce the turbulence of the ventilating air flowing radially inward alongside the downstream face of the plates 25, as indicated by the arrows in FIGS. 7 and 8, which reduces the resistance to such flow. Consequently, the loss in power of the jet engine resulting from the noise suppressor is reduced.

The major axes of the generally elliptical ports 28b, 28c and 28d extend substantially radially, as described above, and the minor axes of such ports extend generally circumferentially of the noise suppressor. The preferred ratio of major axis to minor axis is within the range between 1.35 and 1.45 to 1, but a range between 1.2 and 2.5 to 1 is practical. Each of the nozzles 29a, 29b, 29c and 29d preferably converges rearwardly to some degree as indicated best in FIGS. 4, 5 and 6, and such convergence is indicated as being accomplished principally, if not entirely, by progressive shortening of the major axis of the passage as the nozzle tapers rearwardly, with little or no shortening of the minor axis, so that the ratio of major axis to minor axis decreases rearwardly from the root of each nozzle toward its tip. Such rearward taper of the nozzle accelerates the exhaust gas flowing through each nozzle and reduces loss in power resulting from flow of the exhaust gas through the nozzles while not appreciably reducing the amount of ventilating air flowing radially inward between the nozzles and then axially rearward and minimizing the velocity of such ventilating air flow.

The noise of a jet engine is loudest at takeoff because under such circumstances the airplane engine is required to develop its greatest power; and, consequently, the quantity and speed of the exhaust gas blast will be greatest. It is under such circumstances, therefore, that noise suppression is most important, yet it is under these same circumstances that maximum power is most desirable. The use of any noise suppressor causes loss of power. However, by utilizing noise suppressor plates interposed between the constrictor and the ejector which have elliptical ports and associated nozzles with a major axis extending generally radially and a minor axis extending generally circumferentially, the power loss over using circular ports and cylindrical associated nozzles is considerably reduced. Also, noise, particularly of the lower frequencies, is reduced by locating the ports and nozzles in the central portion of the noise suppressor reasonably close together without sacrificing ventilation. Thus ports of a given size of elliptical shape will be spaced farther apart to increase ventilation, or, alternatively, a given area of ventilation passage can be provided for ports of larger area. Expressed in another way, if the quantity of ventilating air supplied for mixing with the exhaust gas jet is the same, the velocity of the ventilating air is lower where the area of passage for such ventilating air is greater, which reduces the drag of the noise suppressor and increases the collective thrust produced by the individual jets.

FIG. 9 indicates the beneficial reduction in drag and increase in thrust obtained by utilizing ports and individual nozzles which are of elliptical cross section instead of being of circular cross section. In this graph "ventilation parameter" is plotted against percent base drag, which is the drag produced by the noise suppressor. Reduction in base drag corresponds directly to an increase in nozzle thrust and propulsion effectiveness. The quantity $A_S$ is the net radial passage for ventilating air between the nozzles 29b which is determined by the circumference of the circle through the center of this annular row of nozzles minus the sum of the arcs cut from such circle by the roots of such nozzles, which quantity is multiplied by the length of nozzles 29b. $A_S$ therefore constitutes the sum of all of the substantially rectangular radial passages between the adjacent nozzles 29b in the annular row of these nozzles. The quantity $A_B$ is the composite area of the sector plates 25 which are disposed transversely of the direction of exhaust gas flow minus the aggregate area of the ports through the sectors, which gives the total area of the flow passage through the tail pipe 2 that is blocked by the noise suppressor.

FIG. 9 shows that for elliptical ports and nozzles the ventilation parameter $A_S/A_B$ is greater than for circular ports and cylindrical nozzles and the reduction in base drag $\Delta$ is 2 to 3 percent. Consequently, the engine thrust available for useful propulsion is increased by an amount of two to three percent by use of the circumferentially flattened and radially elongated noise suppressor ports and nozzle cross sections of this invention.

The noise suppressor of this invention is compact and is compatible with other components which may be installed in the tail pipe of a jet engine. The constrictor forward of the noise suppressor and the noise suppressor sectors which are interconnected for conjoint movement, as described above, can be actuated by conventional mechanism powered by antifriction screws, for example. Similarly, the ejector can be adjusted by conventional mechanism not shown to alter the cross-sectional area of the passage through it. A thrust reverser T can be located forward of the constrictor, and its components can be swung into the path of exhaust gas discharge to divert such gas so as to be ejected in a forward direction through the louvers L instead of flowing rearward through the tail pipe. While such components are important for most effective control and operation of jet engines, they do not constitute part of the present invention.

We claim:

1. In a noise suppressor for a jet engine having a tail pipe, including generally circular ported plate means in the path of exhaust gas between the jet engine and the tail pipe, such ports through the plate means being spaced apart circumferentially in each of a plurality of generally concentric annular rows, individual nozzles projecting rearwardly from the respective plate means ports, and means for supplying ventilating air from the periphery of the plate means for flow generally radially inward alongside the downstream side of the plate means between the nozzles, the improvement comprising all of the ports through the plate means in such adjacent concentric rows being of substantially the same size and being flattened generally circumferentially and elongated generally radially of such plate means, and the root portions of the nozzles communicating with such ports being correspondingly flattened generally circumferentially and elongated generally radially of the plate means to facilitate flow of ventilating air generally radially inward adjacent to the downstream side of the plate means between circumferentially adjacent nozzles.

2. In a noise suppressor for a jet engine, including ported plate means in the path of exhaust gas between the jet engine and the tail pipe, individual nozzles projecting rearwardly from the plate means ports, and means for supplying ventilating air from the periphery of the plate means for flow generally radially inwardly alongside the downstream side of the plate means between the nozzles, the improvement comprising ports through the plate means being flattened generally circumferentially and elongated generally radially of such plate means, the root portions of the nozzles communicating with such ports being correspondingly flattened generally circumferentially and elongated generally radially to facilitate flow of ventilating air radially inward adjacent to the downstream side of the plate means between adjacent nozzles, the nozzles being tapered rearwardly in such manner that the ratio of major axis to minor axis of the nozzles decreases rearwardly from the root of each nozzle toward its tip.

* * * * *